(12) United States Patent
Akira et al.

(10) Patent No.: US 10,741,833 B2
(45) Date of Patent: Aug. 11, 2020

(54) NEGATIVE ELECTRODE ACTIVE MATERIAL FOR NONAQUEOUS ELECTROLYTE SECONDARY BATTERY

(71) Applicant: SANYO Electric Co., Ltd., Daito-shi, Osaka (JP)

(72) Inventors: Tatsuya Akira, Osaka (JP); Hiroshi Minami, Hyogo (JP); Taizou Sunano, Tokushima (JP); Yoshio Kato, Osaka (JP)

(73) Assignee: SANYO Electric Co., Ltd., Daito-shi, Osaka (JP)

(*) Notice: Subject to any disclaimer, the term of this patent is extended or adjusted under 35 U.S.C. 154(b) by 189 days.

(21) Appl. No.: 16/051,651

(22) Filed: Aug. 1, 2018

(65) Prior Publication Data
US 2019/0044131 A1 Feb. 7, 2019

Related U.S. Application Data

(63) Continuation of application No. 15/318,884, filed as application No. PCT/JP2015/004186 on Aug. 21, 2015, now Pat. No. 10,062,903.

(30) Foreign Application Priority Data
Sep. 1, 2014 (JP) ................... 2014-176834

(51) Int. Cl.
*H01M 8/04* (2016.01)
*H01M 4/36* (2006.01)
(Continued)

(52) U.S. Cl.
CPC .......... *H01M 4/366* (2013.01); *H01M 4/134* (2013.01); *H01M 4/386* (2013.01); *H01M 4/483* (2013.01);
(Continued)

(58) Field of Classification Search
CPC ...................................... H01M 8/04
See application file for complete search history.

(56) References Cited

U.S. PATENT DOCUMENTS

| 2006/0068287 | A1 | 3/2006 | Morita et al. |
| 2011/0062379 | A1 | 3/2011 | Miyawaki et al. |
| 2014/0178754 | A1* | 6/2014 | Kim ............ H01M 4/366 429/211 |

FOREIGN PATENT DOCUMENTS

| CN | 104011910 A | 8/2014 |
| JP | 2005-123175 A | 5/2005 |

(Continued)

OTHER PUBLICATIONS

English Translation of Chinese Search Report dated Oct. 29, 2018 for the related Chinese Patent Application No. 201580046961.9 (2 pages).
(Continued)

*Primary Examiner* — Jacob B Marks
(74) *Attorney, Agent, or Firm* — Westerman, Hattori, Daniels & Adrian, LLP

(57) ABSTRACT

There is provided a negative electrode active material for a nonaqueous electrolyte secondary battery, the negative electrode active material including a base particle containing Si and $SiO_2$, a mixed phase coating that covers a surface of the base particle and contains $SiO_2$ and carbon, and a carbon coating that covers a surface of the mixed phase coating. The base particle is preferably formed of $SiO_X$ ($0.5 \leq X \leq 1.5$). The mixed phase coating preferably contains carbon dispersed in a phase formed of $SiO_2$. The cycle characteristics of a nonaqueous electrolyte secondary battery including negative electrode active material particles containing Si and $SiO_2$ are improved.

7 Claims, 1 Drawing Sheet

(51) Int. Cl.
*H01M 4/134* (2010.01)
*H01M 4/62* (2006.01)
*H01M 4/38* (2006.01)
*H01M 4/48* (2010.01)
*H01M 4/587* (2010.01)
H01M 4/1395 (2010.01)
H01M 10/052 (2010.01)
H01M 4/02 (2006.01)

(52) U.S. Cl.
CPC ........... *H01M 4/587* (2013.01); *H01M 4/625* (2013.01); *H01M 4/1395* (2013.01); *H01M 10/052* (2013.01); *H01M 2004/021* (2013.01); *H01M 2004/027* (2013.01)

(56) References Cited

FOREIGN PATENT DOCUMENTS

| | | |
|---|---|---|
| JP | 2006-92969 A | 4/2006 |
| JP | 2008-153117 A | 7/2008 |
| JP | 2011-60676 A | 3/2011 |
| JP | 2011-233245 A | 11/2011 |
| WO | 2014/119256 A1 | 8/2014 |
| WO | 2015/098024 A1 | 7/2015 |

OTHER PUBLICATIONS

International Search Report dated Nov. 24, 2015, issued in counterpart International Application No. PCT/JP2015/004186 (2 pages).

* cited by examiner

NEGATIVE ELECTRODE ACTIVE MATERIAL FOR NONAQUEOUS ELECTROLYTE SECONDARY BATTERY

CROSS REFERENCE TO RELATED APPLICATIONS

This is a continuation of U.S. patent application Ser. No. 15/318,884 filed on Dec. 14, 2016, which is a 371 of PCT/JP2015/004186 filed on Aug. 21, 2015, which claims the benefit of foreign priority over Japanese Application No. 2014-176834 filed Sep. 1, 2014, the entire contents of which is incorporated herein by reference.

TECHNICAL FIELD

The present invention relates to a negative electrode active material for nonaqueous electrolyte secondary batteries.

BACKGROUND ART

Silicon (Si) and silicon oxide represented by $SiO_X$ provide a higher capacity per unit volume than carbon materials such as graphite. Therefore, a study on using silicon and silicon oxide as negative electrode active materials has been conducted. For example, PTL 1 discloses that $SiO_X$ whose surface is coated with a carbon coating and graphite are used as negative electrode active materials.

CITATION LIST

Patent Literature

PTL 1: Japanese Published Unexamined Patent Application No. 2011-233245

SUMMARY OF INVENTION

Technical Problem

However, nonaqueous electrolyte secondary batteries including silicon and silicon oxide as negative electrode active materials pose a problem in that the reactivity between the negative electrode active material and an electrolytic solution is high and charge-discharge cycle characteristics are poor compared with the case where graphite is used as a negative electrode active material.

Solution to Problem

Accordingly, the negative electrode active material for a nonaqueous electrolyte secondary battery according to the present invention is a particulate negative electrode active material used for a nonaqueous electrolyte secondary battery. The negative electrode active material includes a base particle containing Si and $SiO_2$, a mixed phase coating that covers a surface of the base particle and contains $SiO_2$ and carbon, and a carbon coating that covers a surface of the mixed phase coating.

Advantageous Effects of Invention

According to the present invention, the cycle characteristics of a nonaqueous electrolyte secondary battery including a negative electrode active material containing Si and $SiO_2$ can be improved.

DESCRIPTION OF EMBODIMENTS

Figure 1:
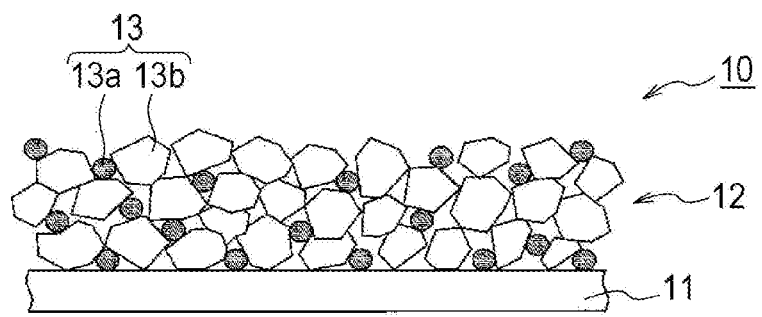
FIG. 1 is a schematic cross-sectional view illustrating a negative electrode according to an embodiment of the present invention.

Hereafter, embodiments of the present invention will be described in detail.

In this specification, the meaning of "substantially *" is that, when "substantially the same" is taken as an example, "substantially the same" is intended to include not only "exactly the same", but also "virtually the same". The drawings referred to in the description of embodiments are schematically illustrated. The dimensional ratios of constituent elements in the drawings may be different from those of actual elements. The specific dimensional ratios and the like should be judged in consideration of the following description.

A nonaqueous electrolyte secondary battery according to an embodiment of the present invention includes a positive electrode containing a positive electrode active material, a negative electrode containing a negative electrode active material, a nonaqueous electrolyte containing a nonaqueous solvent, and a separator. For example, the nonaqueous electrolyte secondary battery has a structure in which an electrode body obtained by winding a positive electrode and a negative electrode with a separator disposed therebetween and a nonaqueous electrolyte are accommodated in a case.

[Positive Electrode]

The positive electrode suitably includes a positive electrode current collector and a positive electrode active material layer formed on the positive electrode current collector. The positive electrode current collector is formed of, for example, a conductive thin film such as a metal foil or alloy foil of aluminum or the like which is stable in the potential range of a positive electrode or a film including a metal surface layer made of aluminum or the like. The positive electrode active material layer preferably contains a conductive material and a binding agent, in addition to the positive electrode active material.

The positive electrode active material is not particularly limited, but is preferably a lithium transition metal oxide. The lithium transition metal oxide may contain a non-transition metal element such as Mg or Al. Specific examples of the lithium transition metal oxide include lithium cobaltate, olivine lithium phosphate such as lithium iron phosphate, and lithium transition metal oxides of Ni—Co—Mn, Ni—Mn—Al, Ni—Co—Al, and the like. These positive electrode active materials may be used alone or in combination of two or more.

The conductive material may be a carbon material such as carbon black, acetylene black, Ketjenblack, or graphite or a mixture of two or more of the foregoing. The binding agent may be polytetrafluoroethylene, polyvinylidene fluoride, polyvinyl acetate, polyacrylonitrile, or polyvinyl alcohol or a mixture of two or more of the foregoing.

[Negative Electrode]

As illustrated in FIG. 1, a negative electrode 10 suitably includes a negative electrode current collector 11 and a negative electrode active material layer 12 formed on the negative electrode current collector 11. The negative electrode current collector 11 is formed of, for example, a conductive thin film such as a metal foil or alloy foil of copper or the like which is stable in the potential range of a negative electrode or a film including a metal surface layer made of copper or the like. The negative electrode active material layer 12 suitably includes a binding agent (not illustrated) in addition to the negative electrode active material 13. The binding agent may be polytetrafluoroethylene or the like as in the case of the positive electrode, but is preferably styrene-butadiene rubber (SBR), polyimide, or the like. The binding agent may be used together with a thickener such as carboxymethyl cellulose.

Figure 2:
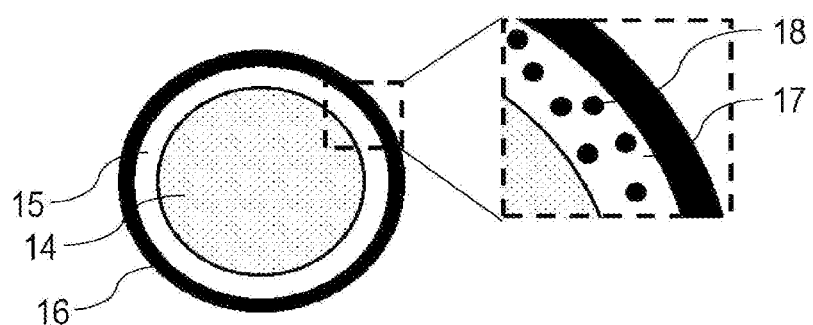
FIG. 2 includes a cross-sectional view schematically illustrating a negative electrode active material particle and a partially enlarged cross-sectional view schematically illustrating the negative electrode active material according to an embodiment of the present invention.

A negative electrode active material 13a is used as the negative electrode active material 13. As illustrated in FIG. 2, the negative electrode active material 13a includes a base particle 14, a mixed phase coating 15, and a carbon coating 16. The base particle 14 contains Si and $SiO_2$. The mixed phase coating 15 contains $SiO_2$ 17 and carbon 18. The mixed phase coating 15 covers a surface of the base particle 14. The carbon coating 16 covers a surface of the mixed phase coating 15. The negative electrode active material 13a includes the base particle 14, the mixed phase coating 15, and the carbon coating 16 in this order in a direction from its center toward its surface.

The base particle 14 is formed of, for example, $SiO_X$ (0.5≤X≤1.5). $SiO_X$ has a structure in which, for example, Si is dispersed in an amorphous $SiO_2$ matrix. Through the observation with a transmission electron microscope (TEM), the presence of dispersed Si can be confirmed. Alternatively, the base particle 14 is formed of, for example, Si with an oxide film. As a result of natural oxidation of Si or oxidation treatment for Si, $SiO_2$ serving as an oxide film is formed.

Since the mixed phase coating 15 containing $SiO_2$ and carbon covers the surface of the base particle 14, the direct reaction between an electrolytic solution and the base particle 14 can be suppressed. In particular, when carbon is dispersed in a phase formed of $SiO_2$ in the mixed phase coating 15, the direct reaction is suppressed and also the negative electrode active material 13a is allowed to have conductivity.

The mixed phase coating 15 is preferably formed of only $SiO_2$ and carbon. If components other than $SiO_2$ and carbon are contained, the diffusion of $Li^+$ to the base particle 14 may be inhibited. Furthermore, the conductivity of the negative electrode active material 13a may degrade or a side reaction may readily occur.

The ratio of $SiO_2$ to carbon in the mixed phase coating 15 is preferably 9:1 to 1:9. If the proportion of $SiO_2$ is excessively small, the direct reaction between the electrolytic solution and the base particle 14 is not easily suppressed. If the proportion of carbon is excessively small, the conductivity of the negative electrode active material 13a tends to degrade.

The mixed phase coating 15 suitably has a substantially uniform thickness across its entire region. The average thickness of the mixed phase coating 15 can be measured by cross-sectional observation of the negative electrode active material particle 13a using a scanning electron microscope (SEM), a transmission electron microscope (TEM), or the like. The average thickness of the mixed phase coating 15 is preferably 0.005 to 1 μm and more preferably 0.01 to 0.3 μm. If the thickness of the mixed phase coating 15 is excessively decreased, the effect of suppressing the direct reaction between the electrolytic solution and the base particle 14 is reduced. If the thickness of the mixed phase coating 15 is excessively increased, the diffusion of $Li^+$ to the base particle 14 is inhibited, which tends to decrease the capacity.

The mixed phase coating 15 preferably covers 100% of the surface of the base particle 14. In the present invention, the phrase "the mixed phase coating 15 covers the base particle 14" means that when the cross-section of the particle is observed with a TEM, a mixed phase coating 15 having a thickness of at least 1 nm covers the particle.

The average thickness of the carbon coating 16 is preferably 1 to 200 nm and more preferably 5 to 100 nm from the viewpoints of conductivity and diffusibility of $Li^+$ to the base particle 14. The average thickness of the carbon coating 16 can be measured by cross-sectional observation of the negative electrode active material particle 13a using a scanning electron microscope (SEM), a transmission electron microscope (TEM), or the like. If the thickness of the carbon coating 16 is excessively decreased, the conductivity degrades and the particle formed of the base particle 14 and the mixed phase coating 15 is not easily covered uniformly. If the thickness of the carbon coating 16 is excessively increased, the diffusion of $Li^+$ to the base particle 14 is inhibited and the capacity tends to decrease. The proportion of the carbon coating relative to the base particle 14 is desirably 10 mass % or less.

The carbon coating 16 covers 50% or more and 100% or less of the surface of a particle formed of the base particle 14 and the mixed phase coating 15 and preferably covers 100% of the surface. In the present invention, the phrase "the carbon coating 16 covers a particle formed of the base particle 14 and the mixed phase coating 15" means that when the cross-section of the particle is observed with a SEM, a carbon coating 16 having a thickness of at least 1 nm covers the particle.

The surface of the base particles 14 can be covered by the mixed phase coating 15 by, for example, mixing an aqueous solution containing an organic acid catalyst and base particles 14, performing hydrolysis and polymerization at 80° C. to 120° C., vaporizing water, and then performing heat treatment at 500° C. to 800° C. When the aqueous solution containing an organic acid catalyst and the base particles 14 are mixed, a lithium compound may be added. Examples of the organic acid catalyst include citric acid, malic acid, tartaric acid, lactic acid, and glycolic acid. Examples of the lithium compound include LiOH, $Li_2CO_3$, LiF, and LiCl. By performing the above method, $SiO_2$ in the base particles 14 and the organic acid catalyst react with each other on the surface of each of the base particles 14. Thus, a mixed phase coating 15 containing $SiO_2$ and carbon is formed on the surface of the base particle 14. In the above method, for example, even when the aqueous solution containing an organic acid catalyst and the base particles 14 each including the carbon coating 16 are mixed, the mixed phase coating 15 is formed between the carbon coating 16 and the base particle 14.

The carbon coating 16 can be formed by a typical method such as a CVD method, a sputtering method, or a plating method (electroplating or electroless plating). For example, when the carbon coating 16 is formed on the surface of $SiO_X$ particles by a CVD method, $SiO_X$ particles and a hydrocarbon gas are heated in a gas phase and carbon generated as a result of pyrolysis of the hydrocarbon gas is deposited on the $SiO_X$ particles. The hydrocarbon gas may be methane gas or acetylene gas.

The negative electrode active material 13a may be used alone as the negative electrode active material 13. However, the negative electrode active material 13a is suitably used in combination with another negative electrode active material 13b having a smaller volume change due to charge and discharge than the negative electrode active material 13a from the viewpoints of achieving high capacity and improving cycle characteristics. The negative electrode active material 13b is not particularly limited, but is preferably a carbon-based active material such as graphite or hard carbon.

In the case where the negative electrode active material 13a and the negative electrode active material 13b are used in combination, for example, when the negative electrode active material 13b is graphite, the mass ratio of the negative electrode active material 13a to the graphite is preferably 1:99 to 20:80. When the mass ratio is within the above range, both high capacity and good cycle characteristics are easily achieved. If the content of the negative electrode active material 13a relative to the total mass of the negative electrode active material 13 is less than 1 mass %, the advantage of achieving high capacity by adding the negative electrode active material 13a is reduced.

The average particle size of the base particles 14 is preferably 1 to 15 μm and more preferably 4 to 10 μm. In this specification, the term "average particle size" refers to a particle size (volume-average particle size, $Dv_{50}$) at which the volume-based cumulative distribution reaches 50% in the particle size distribution measured by a laser diffraction/scattering method. $Dv_{50}$ can be measured with, for example, "LA-750" manufactured by HORIBA, Ltd. If the average particle size of the base particles 14 is excessively decreased, the surface area of the particles excessively increases. As a result, the amount of reaction with the electrolytic solution increases, which may decrease the capacity. If the average particle size is excessively increased, the volume expansion of the base particles 14 during the charge may have a large influence on degradation of the charge-discharge characteristics.

As in the case of the conductive material for the positive electrode active material layer, the carbon material for the carbon coating 16 may be carbon black, acetylene black, Ketjenblack, graphite, or a mixture of two or more of the foregoing.

The base particle 14 may contain lithium silicate (e.g., $Li_4SiO_4$, $Li_2SiO_3$, $Li_2Si_2O_5$, and $Li_3SiO_6$) therein.

[Nonaqueous Electrolyte]

Examples of an electrolyte salt of the nonaqueous electrolyte include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylates, LiCl, LiBr, LiI, chloroborane-lithium, borates, and imide salts. Among them, $LiPF_6$ is preferably used from the viewpoints of ionic conductivity and electrochemical stability. These electrolyte salts may be used alone or in combination of two or more. These electrolyte salts are preferably contained in an amount of 0.8 to 1.5 mol per 1 L of the nonaqueous electrolyte.

A solvent of the nonaqueous electrolyte is, for example, a cyclic carbonate, a chain carbonate, or a cyclic carboxylate. Examples of the cyclic carbonate include propylene carbonate (PC) and ethylene carbonate (EC). Examples of the chain carbonate include diethyl carbonate (DEC), ethyl methyl carbonate (EMC), and dimethyl carbonate (DMC). Examples of the cyclic carboxylate include γ-butyrolactone (GBL) and γ-valerolactone (GVL). These nonaqueous solvents may be used alone or in combination of two or more.

[Separator]

A porous sheet having ion permeability and an insulating property is used as the separator. Specific examples of the porous sheet include microporous membranes, woven fabrics, and nonwoven fabrics. The separator is suitably made of a polyolefin such as polyethylene or polypropylene.

EXAMPLES

Hereafter, the present invention will be further described based on Example, but the present invention is not limited to Example.

Example

Experiment 1

[Production of Negative Electrode]

$SiO_X$ (X=0.93, average primary particle size: 5.0 μm) whose surface was covered by carbon was prepared. The covering was performed by a CVD method. The content of the carbon in the $SiO_X$ was 10 mass %. The carbon coverage on the surface of the $SiO_X$ was 100%.

Figure 3:
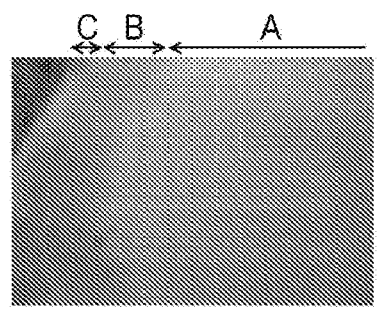
FIG. 3 is a first electron microscope image illustrating the cross-section of a negative electrode active material particle used in Experiment 1.

After 0.5 mol of $Li_2CO_3$ was added to 1000 g of water, 0.2 mol of citric acid was added thereto to prepare an aqueous solution in which $Li_2CO_3$ was completely dissolved. One mol of the $SiO_X$ prepared above was added to the aqueous solution and mixing was performed. The resulting mixture solution was subjected to a dehydration condensation reaction at 80° C. and dried at 120° C. Subsequently, the resulting intermediate was heat-treated in an Ar atmosphere at 600° C. for 5 hours and then allowed to cool to room temperature over 2 hours, and the $SiO_X$ was washed with pure water. The $SiO_X$ particles subjected to the heat treatment and the washing with water were observed using an electron microscope image (TEM). Consequently, it was confirmed that a mixed phase coating covered 100% of the $SiO_X$ surface, and a carbon coating covered 100% of the surface of the mixed phase coating. FIG. 3 illustrates an electron microscope image (TEM) of the obtained negative electrode active material particles. In FIG. 3, a region A corresponds to the $SiO_X$, a region B that is located outside the region A and is a slightly dark layer corresponds to the mixed phase coating, and a region that is located outside the region B and is a white layer corresponds to the carbon coating.

The average thickness of the mixed phase coating was 100 nm. The average thickness of the mixed phase coating was calculated as follows. The cross-section of a negative electrode was exposed by a cross-section polisher method, and the exposed cross-section was observed with a TEM. Five treated $SiO_X$ particles were randomly sampled. The thickness of the mixed phase coating on each of the $SiO_X$ particles was measured at five positions, and the average of the thicknesses was defined as a thickness of the mixed phase coating.

The $SiO_X$ subjected to the heat treatment and the washing with water and PAN (polyacrylonitrile) serving as a binder were mixed with each other at a mass ratio of 95:5. NMP (N-methyl-2-pyrrolidone) serving as a diluent solvent was further added thereto. The resulting mixture was stirred with a mixer (ROBOMIX manufactured by PRIMIX Corporation) to prepare a negative electrode mixture slurry. The negative electrode mixture slurry was applied onto one surface of a copper foil so that the mass of the negative electrode mixture layer per 1 $m^2$ was 25 g. The copper foil was then dried at 105° C. in the air and rolled to produce a negative electrode. The packing density of the negative electrode mixture layer was 1.50 g/ml.

[Preparation of Nonaqueous Electrolytic Solution]

Lithium hexafluorophosphate ($LiPF_6$) was added to a mixed solvent prepared by mixing ethylene carbonate (EC) and diethyl carbonate (DEC) at a volume ratio of 3:7 so that the concentration of $LiPF_6$ was 1.0 mol/L. Thus, a nonaqueous electrolytic solution was prepared.

[Assembly of Battery]

In an inert atmosphere, an electrode body was produced using the negative electrode having a periphery to which a Ni tab was attached, a lithium metal foil, and a polyethylene separator disposed between the negative electrode and the lithium metal foil. The electrode body was inserted into a battery case formed of an aluminum laminate. The nonaqueous electrolytic solution was further injected into the battery case. Then, the battery case was sealed to produce a battery A1.

Experiment 2

A battery A2 was produced in the same manner as in Experiment 1, except that the cooling time after the heat treatment was changed to 1 hour. The average thickness of the mixed phase coating of the $SiO_X$ particles subjected to the heat treatment and the washing with water was 40 nm.

Experiment 3

A battery A3 was produced in the same manner as in Experiment 1, except that the cooling time after the heat treatment was changed to 5 hours. The average thickness of the mixed phase coating of the $SiO_X$ particles subjected to the heat treatment and the washing with water was 130 nm.

Experiment 4

A battery Z was produced in the same manner as in Experiment 1, except that untreated $SiO_X$ was used as the $SiO_X$ serving as a negative electrode active material (i.e., $SiO_X$ without a mixed phase coating was used).

(Experiment)

Each of the batteries was charged and discharged under the following conditions to determine an initial charge-discharge efficiency represented by formula (1) below and a tenth-cycle capacity retention ratio represented by formula (2) below. Table 1 shows the results.

[Charge-Discharge Conditions]

Constant current charge was performed at a current of 0.2 It (4 mA) until the voltage of the battery reached 0 V. Constant current charge was then performed at a current of 0.05 It (1 mA) until the voltage of the battery reached 0 V. After a pause time of 10 minutes, constant current discharge was performed at a current of 0.2 It (4 mA) until the voltage of the battery reached 1.0 V.

[Calculation Formula of Initial Charge-Discharge Efficiency]

Initial charge-discharge efficiency (%)=(First-cycle discharge capacity/First-cycle charge capacity)×100    (1)

[Calculation Formula of Tenth-Cycle Capacity Retention Ratio]

Tenth-cycle capacity retention ratio (%)=(Tenth-cycle discharge capacity/First-cycle discharge capacity)×100    (2)

TABLE 1

| Battery | Mixed phase coating | Thickness of mixed phase coating (nm) | Tenth-cycle capacity retention ratio (%) |
| --- | --- | --- | --- |
| A1 | Formed | 100 | 53 |
| A2 | Formed | 40 | 21 |
| A3 | Formed | 130 | 61 |
| Z | Not formed | — | 7 |

In the battery Z in which the mixed phase coating was not formed on the surface of the $SiO_X$ particles, it is believed that the direct reaction between the electrolytic solution and the $SiO_X$ could not be suppressed, which decreased the capacity retention ratio after the cycle test. In the batteries A1 to A3 in which the mixed phase coating was formed on the surface of the $SiO_X$ particles, it is believed that the direct reaction between the electrolytic solution and the $SiO_X$ could be suppressed, which improved the capacity retention ratio after the cycle test.

REFERENCE SIGNS LIST

10 negative electrode
11 negative electrode current collector
12 negative electrode active material layer
13, 13a, 13b negative electrode active material
14 base particle
15 mixed phase coating
16 carbon coating
17 $SiO_2$
18 carbon

The invention claimed is:

1. A negative electrode active material particle used for a nonaqueous electrolyte secondary battery, the negative electrode active material particle comprising:
 a base particle containing $SiO_X$ ($0.5 \leq X \leq 1.5$);
 a mixed phase coating that covers a surface of the base particle and contains $SiO_2$ and carbon; and
 a carbon coating that covers a surface of the mixed phase coating.

2. The negative electrode active material for a nonaqueous electrolyte secondary battery according to claim 1, wherein the mixed phase coating comprises carbon dispersed in a phase formed of $SiO_2$.

3. The negative electrode active material for a nonaqueous electrolyte secondary battery according to claim 1, wherein the mixed phase coating consists-essentially $SiO_2$ and carbon.

4. The negative electrode active material for a nonaqueous electrolyte secondary battery according to claim 3, wherein the mixed phase coating has an average thickness of 0.005 μm to 1 μm.

5. The negative electrode active material for a nonaqueous electrolyte secondary battery according to claim 4, wherein the mixed phase coating covers 100% of the surface of the base particle.

6. The negative electrode active material for a nonaqueous electrolyte secondary battery according to claim 5, wherein the carbon coating covers 50% or more and 100% or less of a surface of a particle comprising the base particle and the mixed phase coating.

7. The negative electrode active material for a nonaqueous electrolyte secondary battery according to claim 1,
 wherein the mixed phase coating comprises carbon dispersed in a phase formed of $SiO_2$,
 wherein the mixed phase coating consists-essentially $SiO_2$ and carbon, wherein the mixed phase coating has an average thickness of 0.005 μm to 1 μm,
wherein the mixed phase coating covers 100% of the surface of the base particle, and,
wherein the carbon coating covers 50% or more and 100% or less of a surface of a particle comprising the base particle and the mixed phase coating.

* * * * *